United States Patent [19]
Mandel

[11] 3,798,797
[45] Mar. 26, 1974

[54] APPARATUS FOR SYNTHESIS AND ANALYSIS OF LETTER REPRESENTATIONS OF SPEECH SOUNDS

[76] Inventor: David J. Mandel, 118 Riverside Dr., New York, N.Y. 10024

[22] Filed: Jan. 29, 1973

[21] Appl. No.: 327,299

[52] U.S. Cl. .................. 35/35 R, 35/35 F, 35/71, 35/74, 35/75
[51] Int. Cl. .......................................... G09b 17/00
[58] Field of Search ...... 35/35 R, 35 F, 35 G, 35 H, 35/35 J, 74, 75, 76, 71

[56] References Cited
UNITED STATES PATENTS

| | | | |
|---|---|---|---|
| 1,634,194 | 6/1927 | Jacobs | 35/74 |
| 1,224,742 | 5/1917 | Hillyer | 35/35 H X |
| 2,938,282 | 5/1960 | Spielman | 35/35 H |
| 3,200,517 | 8/1965 | D'Agostino | 35/35 F |
| 1,285,038 | 11/1918 | Chance | 35/74 |
| 2,265,334 | 12/1941 | Armbruster | 35/35 UX |
| 1,019,545 | 3/1912 | Southworth | 35/74 |

FOREIGN PATENTS OR APPLICATIONS

| | | | |
|---|---|---|---|
| 397,067 | 2/1909 | France | 35/74 |
| 749,001 | 5/1956 | Great Britain | 35/35 F |

*Primary Examiner*—Wm. H. Grieb
*Attorney, Agent, or Firm*—Flynn & Frishauf

[57] ABSTRACT

The apparatus includes at least one first indicia carrying member, such as cards, each having a plurality of projections thereof, each projection carrying at least one letter. At least one second indicia carrying member has a plurality of slots formed therein, each slot having at least one letter in registration therewith. The projections of one member engaged with the slots on the other member and the letters of the engaging slots and projections become in registration to combine to produce a combination of letters representing a sound. The elements are engageable in different relative positions to produce different representations of sounds. Preferably, the projections carry consonants or consonant blends, and the slots carry groups of letters beginning with a vowel.

18 Claims, 4 Drawing Figures

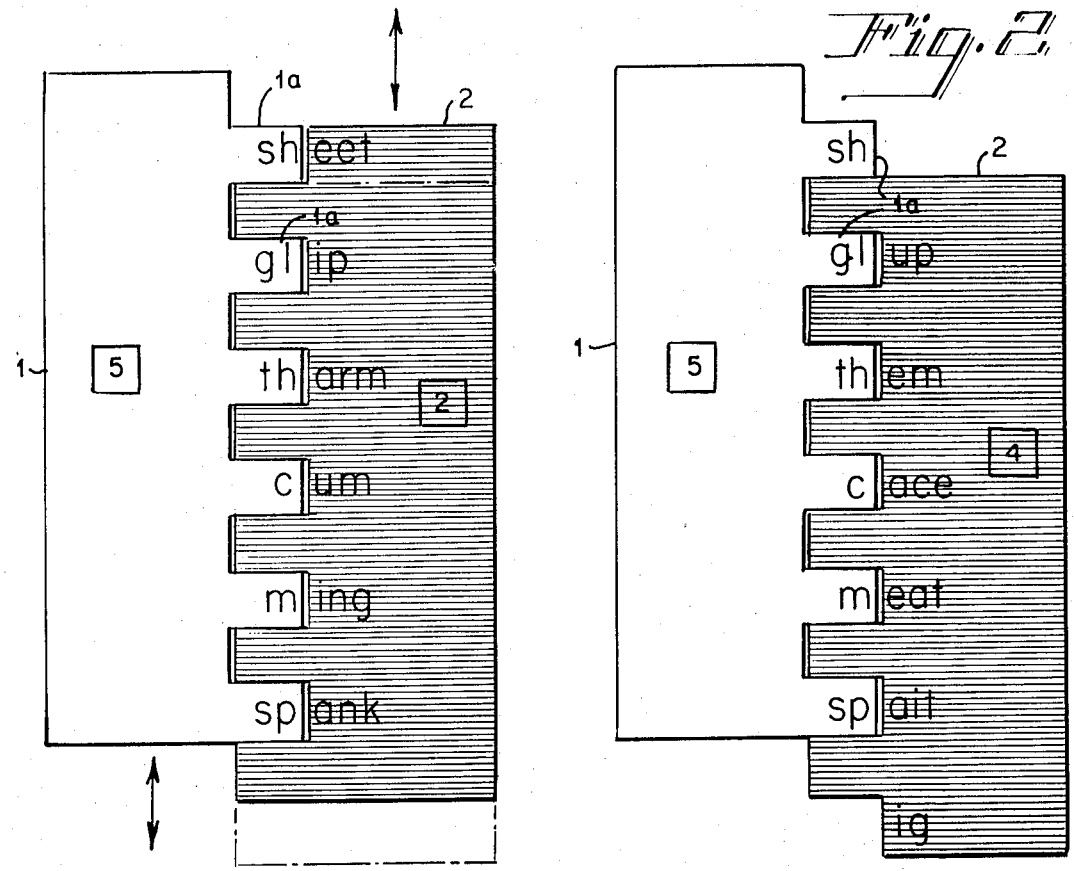
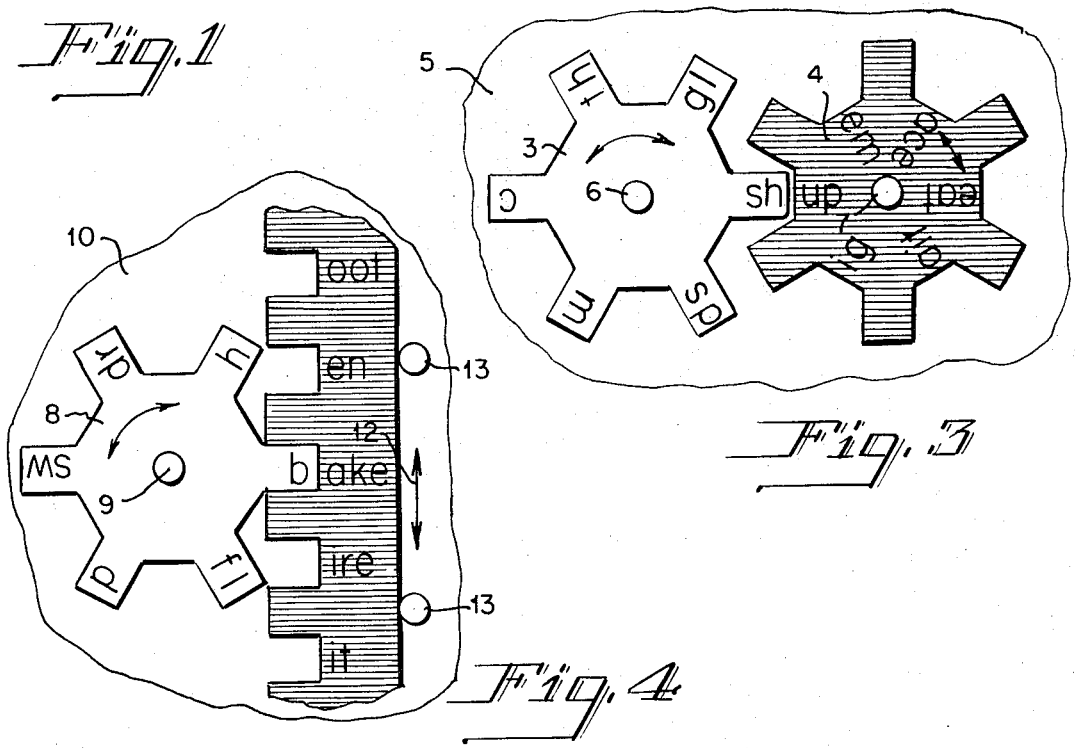

APPARATUS FOR SYNTHESIS AND ANALYSIS OF LETTER REPRESENTATIONS OF SPEECH SOUNDS

This invention relates to a teaching apparatus, and more particularly to an apparatus for teaching beginning reading and writing.

Teaching of beginning reading has traditionally proceeded along two lines: phonetic training and whole-word recognition training. Phonetic methods employing the ordinary Latin alphabet present the beginner with formidable difficulties that inhere in all alphabetic systems and particularly in English: a small number of symbols is employed to represent a virtually unlimited number of sounds. Consequently, position and combination of the symbols is critical in recognition. The beginner can be taught the few symbols with relative ease, but awareness of positional significance is difficult to acquire. The beginner is unable to synthesize individual letters into the sounds that their position memorializes.

Some phonetic methods employ an expanded alphabet in an attempt to avoid this problem. Such methods require the beginner to learn new and non-standard alphabetic characters (and later to discard them). Such methods have not to date shown any substantial advantage over standard phonetic methods.

Whole-word recognition methods attempt to avoid the difficulties inherent in alphabetic systems by requiring the beginner to recognize the patterns of entire words. This is a retreat to logography, and in effect, a betrayal of the symbol economy of alphabetic systems. The beginner has very little preparation for attacking unfamiliar words; beginning reading is reduced to a guessing game.

Some of the objects of the present invention are: 1. to use only the standard alphabet so that no new symbols have to be learned; 2. to allow the beginner to grasp the nature of alphabetic writing through his own activity; 3. to supply the beginner with the means for attacking unfamiliar words; 4. to encourage practice through an attractive, amusing format; 5. to induce reading from left to right.

SUMMARY OF THE INVENTION

According to the present invention apparatus is provided for teaching the synthesis and analysis of alphabetic representations of speech-sounds. A plurality of indicia carrying members, such as cards is provided, some cards preferably having a number of projections that engage with corresponding slots on other cards. The projections of one indicia carrying member have printed on them consonants and consonant blends. The slots of another indicia carrying member are printed with any number of pronounceable letters beginning with a vowel. All indicia carrying members having indicia on projections are coded, preferably by color, as belonging to a first group and all indicia carrying members having indicia printed in slots are coded as belonging to a second group. By selective interengagement of the slots and projections of indicia carrying members of the first and second groups, different letter combinations representing different sounds are produced.

In a preferred embodiment, when projection and slot cards are interengaged, speech-sounds within the compass of English are unfailingly produced. Some of these speech sounds are complete English words, others are recognizable as parts of English words. It is possible to locate the consonants and consonant blends in the slots rather than on the projections. However, it is preferred to locate the consonants and consonant blends on the projections since the beginner is naturally induced to read from left to right (often a stumbling block for beginners) by following the direction of the projection.

BRIEF DESCRIPTION OF THE DRAWINGS

FIG. 1 illustrates a first embodiment of the invention comprised of pairs of card-type indicia carrying members;

FIG. 2 illustrates the embodiment of FIG. 1 with one of the cards reversed to provide additional letter combinations;

FIG. 3 shows another embodiment of the invention using indicia carrying members in the form of notched discs; and FIG. 4 illustrates a further embodiment of the invention using a notched disc and a notched card-type member.

DETAILED DESCRIPTION OF PREFERRED EMBODIMENT

Referring to FIG. 1, card number 1 has a plurality of projections 1a, each projection carrying consonants or consonant blends. Engaged with card number 1 is a second card 2 which has a plurality of slots or indentations formed therein, the portions of the cards corresponding to the slots or indentations carrying a pronounceable letter or letters beginning with a vowel. When cards 1 and 2 are interengaged with the projections 1a of card 1 engaged with the slots of card 2, the letters of the cards are in registration to form pronounceable sounds. The invention is indifferent as to whether correctly spelled words are formed. Card number 1 is preferably coded as belonging to a first set, for example by fabricating cards number 1 of white material, such as cardboard, plastic, or the like. Card number 2 is preferably coded as belonging to a second group, for example by fabricating it of a blue material such as cardboard, plastic, or the like. It should be clear that various color combinations could be used, as desired. The cards also preferably carry numbers on each face thereof so that the user can easily vary the combinations of cards to provide a multitude of different sounds. For example, in FIG. 1, card faces 5 and 2 are shown in interengagement. In FIG. 2, face 5 of card 1 is used in connection with face 4 of card 2. Face 4 is the reverse side of card 2. This provides additional combinations of sounds. When both sets of cards of the present invention have indicia printed on both sides thereof, four different combinations are produced from any two cards.

In FIG. 1, cards 1 and 2 are shown in solid lines in a first position. After the user of the apparatus reads the sounds represented by cards 1 and 2 in the first position, card number 2 may be moved to a second position (shown by dashed lines) to provide another set of sounds to be read by the user. The cards may be successively advanced to provide a plurality of sounds, the number of sounds being determined by the number of corresponding slots on projections on the respective cards. It should be clear that the cards may be produced in any size, as desired, and that the slots and projections may be in any shape or form, as long as interengagement with the letters in registration is provided. For example, the slots and projections may be of the interlocking type, or may comprise semicircles, or any other convenient or desirable shape.

FIG. 3 illustrates another embodiment of the invention wherein the indicia carrying members take the form of interengaging discs 3 and 4. In FIG. 3, the disc 3 essentially corresponds to the card 1 of FIG. 1, and the disc 4 essentially corresponds to the card 2 of FIG. 1. Discs 3 and 4 may be appropriately color-coded for example white and blue, so as to insure proper use of the discs. The discs 3 and 4 are preferably mounted on a base 5 carrying a pair of shafts 6 and 7. Discs 3 and 4 are removably inserted on shafts 6 and 7, respectively, and are rotatable about said shafts. In use, the operator merely rotates one of the discs to cause selective slots and projections to become engaged to provide registration of letters which represent a sound, similar to the concept illustrated in FIG. 1. In the embodiment of FIG. 3, however, letters forming only one sound are produced at a time. In the embodiment of FIGS. 1 and 2, a plurality of combinations of letters are simultaneously produced so that the user may merely read the list of sounds. In FIG. 3, it is necessary to rotate the discs 3 and 4 to successively produce combinations of letters representing a sound.

The discs 3 and 4 are removable from the shafts 6 and 7 and preferably contain indicia on the reverse sides thereof so that additional combinations of letters can be provided. A plurality of discs may be provided to provide still further combinations of letters to provide a large number of different sounds.

FIG. 4 illustrates another embodiment of the invention wherein a slotted disc 8, corresponding to disc 3 of FIG. 3 and card 1 of FIG. 1 is provided with indicia on the projections thereof. Disc 8 is rotatably and removably mounted on a shaft 9 which projects from a base member 10. Interengaged with disc 8 is slotted card 11 which is movable in the direction of arrow 12 upon rotation of disc 8 with the slots and projections of the disc and card in interengagement. Guide members 13 are provided so that the card 11 will remain in its proper orientation with respect to the disc 8 during movement thereof. Other guiding means 13 may be provided as desired. As in the above embodiments, the disc 8 and card 11 preferably have indicia printed on the reverse sides thereof to produce additional combinations of letters. Additionally, the apparatus may include a plurality of discs 8 and a plurality of cards 11 which may be used in any combination to provide a large number of sounds.

It should be clear that the various cards and discs of the present invention may be fabricated from any type of material, depending upon economic and use considerations. For example, the cards and/or discs may be made of stiff cardboard type material, plastic material or any other convenient material. The indicia may be printed on the cards directly or may be applied by means of adhesive overlays, or the like.

The following discussion of the concepts of the present invention, in connection with the usage thereof with beginning readers is given with respect to the embodiment of FIGS. 1 and 2. However, it should be clear that the discussion is equally applicable with respect to the embodiments of FIGS. 3 and 4.

The beginning reader (or a poor reader) cannot defect the purpose of the invention by placing two projection cards 1 or two slot cards 2 together. He is bound to observe that such placement results in upside down characters that do not meet. After a little practice the beginner learns that only when a projection card 1 is to the left and a slot card 2 to the right will the letter-clusters be right-side-up and readable. The color clue provided by making the projection cards 1 one color and slot cards 2 another reinforces this.

When projection and slot cards are interengaged and letter clusters within the compass of English are produced, the student is enabled to acquire the vital understanding that writing is at base a method of memorializing speech sounds, that is, spoken language, and that reading is the process by which we can recall the speech it represents. Stated abstractly this information is of minimal value to the beginning reader-writer. Discovered in action through the use of the invention, this information is highly valuable for it gives coherence to the activity of reading and writing.

Even with an understanding of the nature of reading and writing and a knowledge of the letters of the alphabet, the beginner frequently finds himself stymied by an inability to comprehend the synthesis of letters into sounds. The invention assists him in this act of synthesis by compelling him to perform it himself while affording him the means to do so. The beginner pushes a projection 1a into a slot to synthesize a sound; he pulls the projection from the slot and is thus able to analyze its component parts.

The number of letter-clusters formed by engaging two cards is equal to the square of the number of projections. In a preferred embodiment when each card is printed on both sides, the total for any two cards is twice the square of the number of projections. A card having but six projections thus provides 144 separate speech sounds. Immense variety is attained with economy of means.

The interengaging feature of the invention prevents the student from forming a letter-cluster not within the compass of English or any other language to which the invention is applied. Conversely, it allows him to construct a speech sound by fitting together its elements. The interengaging feature of the invention also allows either card to be extended in chains or ladders and to be moved without upsetting the position. A ladder so constructed can be shifted by one or more slots so as to expose an entirely new set of speech sounds throughout its length. The "play" element contributed by the interengaging feature has been found to encourage use and hence facilitate learning.

Separating the letter components by placing them on projections and slots requires the student to synthesize the two parts to form a speech sound and it allows him to analyze parts of a speech sound. When using the embodiment of FIGS. 1 and 2, by observing a single projection moved from slot to slot he learns by alliteration; by observing a single slot moved from projection to projection he learns by rhyme. This is another important feature of the apparatus of the present invention.

When using the present invention, no clues as to the nature of the speech sound is provided by context. The student can gain facility only by associating letter combinations with the speech sounds they represent. The rapidity and ease of change of the letter combinations afforded by shifting the interengagement or reversing the face of the cards allows the student to work in small increments and at his own pace. Moreover, it gives greater scope to the student's imagination than do beginners' texts which contain fixed word or sound lists and which are bound to a vocabulary more rudimentary than the student's speaking vocabulary. Even when a letter-cluster forms no recognizable English word it may represent a sound that is part of a word. For example, the student familiar with blist, dist, wint, stant and cig through the use of the invention has the resources to read blister, distant, winter, instant and cigar.

In addition to its use in teaching beginning reading and writing, the invention has application as vocabulary builder. Many letter clusters created by the interengagement of projection and slot are words that beginners can sound out but whose meanings they are not likely to know. Thus, for instance, dop, mete, cove and hake, all of which are English words, can be explained by a teacher (with or without the use of a dictionary). Letter-clusters which have no conventional meaning can be given amusing meanings as part of a class exercise.

I claim:

1. Apparatus for synthesis and analysis of letter representations of speech sounds and for providing directional orientation of the letter representations, comprising;
   at least one first indicia carrying member having a plurality of projecting portions thereon which are visible to an operator of the apparatus, said projecting portions carrying at least one letter thereon which forms a part of a speech sound; and
   at least one second indicia carrying member having a plurality of slots formed therein which are visible to the operator, said slots having at least one letter in registration therewith, and said slots of said second indicia carrying member being engageable with the projections of said first indicia carrying member with respective letters of said members in selective registration so that they combine to produce a horizontally arranged representation of a speech sound, said indicia carrying members being selectively engageable at a plurality of relative positions to provide a plurality of horizontally arranged representations of different speech sounds.

2. Apparatus according to claim 1 wherein said projecting portions of said at least one first indicia carrying member carries at least one consonant thereon, and wherein said at least one second indicia carrying member carries a vowel in registration with the slots thereof, said consonants and vowels combining to produce speech sounds.

3. Apparatus according to claim 2 wherein said projections carry consonant blends thereon.

4. Apparatus according to claim 1 comprising a plurality of first and second indicia carrying members, each of said first indicia carrying members being selectively engageable with each of said second indicia carrying members to provide a plurality of different representations of speech sounds.

5. Apparatus according to claim 1 wherein said indicia carrying members are substantially flat members carrying respective letters on both the obverse and the reverse flat sides thereof, whereby a given pair of members are relatively engageable in four different positions to provide four different combinations of representations of speech sounds.

6. Apparatus according to claim 1 wherein said at least one first indicia carrying member and said at least one second indicia carrying member are both elongated elements having repective projections and slots formed in one side thereof.

7. Apparatus according to claim 6 wherein said first and second indicia carrying members are respectively coded with a unique code which differentiates said first and second members.

8. Apparatus according to claim 1 wherein said first indicia carrying members are coded, and said second indicia carrying members are coded with a different code so as to render said first and second indicia carrying members distinct.

9. Apparatus according to claim 8 wherein said first indicia carrying members are of a first color and said second indicia carrying members are of a second color.

10. Apparatus according to claim 1 wherein said at least one first indicia carrying member is a disc having a plurality of said projections around the periphery thereof, and wherein said at least one second indicia carrying member is a disc having a plurality of said slots around the periphery thereof, said slots and projections being selectively engageable.

11. Apparatus according to claim 10 including means for rotatably mounting said discs such that said slots and projections are selectively engageable, different representations of speech sounds being produced by selective rotation of said discs so as to cause different projections to engage with different slots.

12. Apparatus according to claim 11 wherein said mounting means removably mounts said discs.

13. Apparatus according to claim 1 wherein at least one of said first and second indicia carrying members is a disc having said projections thereon, and wherein the other of said first and second indicia carrying members is an elongated element having said slots formed along a side thereof, said slots being selectively engageable with said projections.

14. Apparatus according to claim 13 wherein said at least one first indicia carrying member comprises said disc having said projections thereon, and wherein said at least one second indicia carrying member comprises said elongated member having said slots formed therein.

15. Apparatus according to claim 13 wherein said disc is rotatably and removably mounted relative to said elongated member, and wherein said elongated member is slideably mounted relative to said disc, different representations of speech sounds being produced by selective rotation of said disc so as to cause different projections to engage with different slots of said elongated member.

16. Apparatus according to claim 1 wherein said slots receive indicia carrying portions of said projections therein.

17. Apparatus according to claim 16 wherein said letters in registration with respective slots are in registration with substantially the innermost recessed portions of said slots.

18. Apparatus according to claim 1 wherein said first indicia carrying member is engageable to the left of said second indicia carrying member so as to provide left-right directional orientation of said horizontally arranged representations of speech sounds.

* * * * *